Dec. 14, 1965   E. M. SADOWNICK   3,222,862
HIGH TEMPERATURE NOZZLE FOR ROCKET MOTOR
Filed April 12, 1962

INVENTOR.
ELI M. SADOWNICK

United States Patent Office 3,222,862
Patented Dec. 14, 1965

3,222,862
HIGH TEMPERATURE NOZZLE FOR
ROCKET MOTOR
Eli M. Sadownick, Sacramento, Calif., assignor to Aerojet-General Corporation, Azusa, Calif., a corporation of Ohio
Filed Apr. 12, 1962, Ser. No. 186,985
5 Claims. (Cl. 60—35.6)

This invention relates to a nozzle and more particularly to a high temperature gas nozzle for a rocket motor.

The thrust of a rocket motor depends on the temperature of the exhaust gases produced by the combustion of the fuel, and in general, for any given rocket motor, the higher the temperature of the exhaust gases, the greater the thrust of the rocket. One of the factors limiting the thrust obtainable from a rocket is the ability of the materials composing the rocket motor to withstand the high temperatures produced by the combustion of the gases.

The throat of the rocket motor nozzle has the effect of increasing the speed of the exhaust gases, and the combination of very high temperatures and the high gas speed imposes very severe conditions on the rocket motor throat. As a consequence, there is a tendency for the rocket motor throat to erode and change in size while the rocket motor is operating. Since the performance of a rocket motor is very sensitive to changes in the physical dimensions of the throat, erosion can have important effects on rocket motor performance.

Since erosion increases generally with temperature, efforts have been made to reduce throat erosion by cooling the throat with evaporants, or in some cases, cooling coils. However, these techniques increase the complexity of the rocket motor and consequently increase cost and introduce problems of reliability.

What is needed, therefore, and comprises the principal object of this invention, is to provide a nozzle for a rocket motor with simple reliable means for reducing the temperature of the nozzle throat so that the rocket motor can be operated at a higher temperature to provide increased thrust.

The invention in its broadest aspect comprises providing the nozzle of the rocket motor with a graphite convergent-divergent portion to serve as a heat sink. The throat of the convergent-divergent portion is recessed and an erosion-resistant tungsten or tungsten-tantalum alloy insert is mounted therein with a surface exposed to the hot gas stream. To decrease the temperature of the throat and thereby further reduce erosion, a conductive material is connected between the insert and the heat sink to conduct heat from the throat insert to the heat sink. With this arrangement, the temperature of the throat insert is lowered and the heat conducted from the insert is stored in the graphite heat sink.

Figure 1:
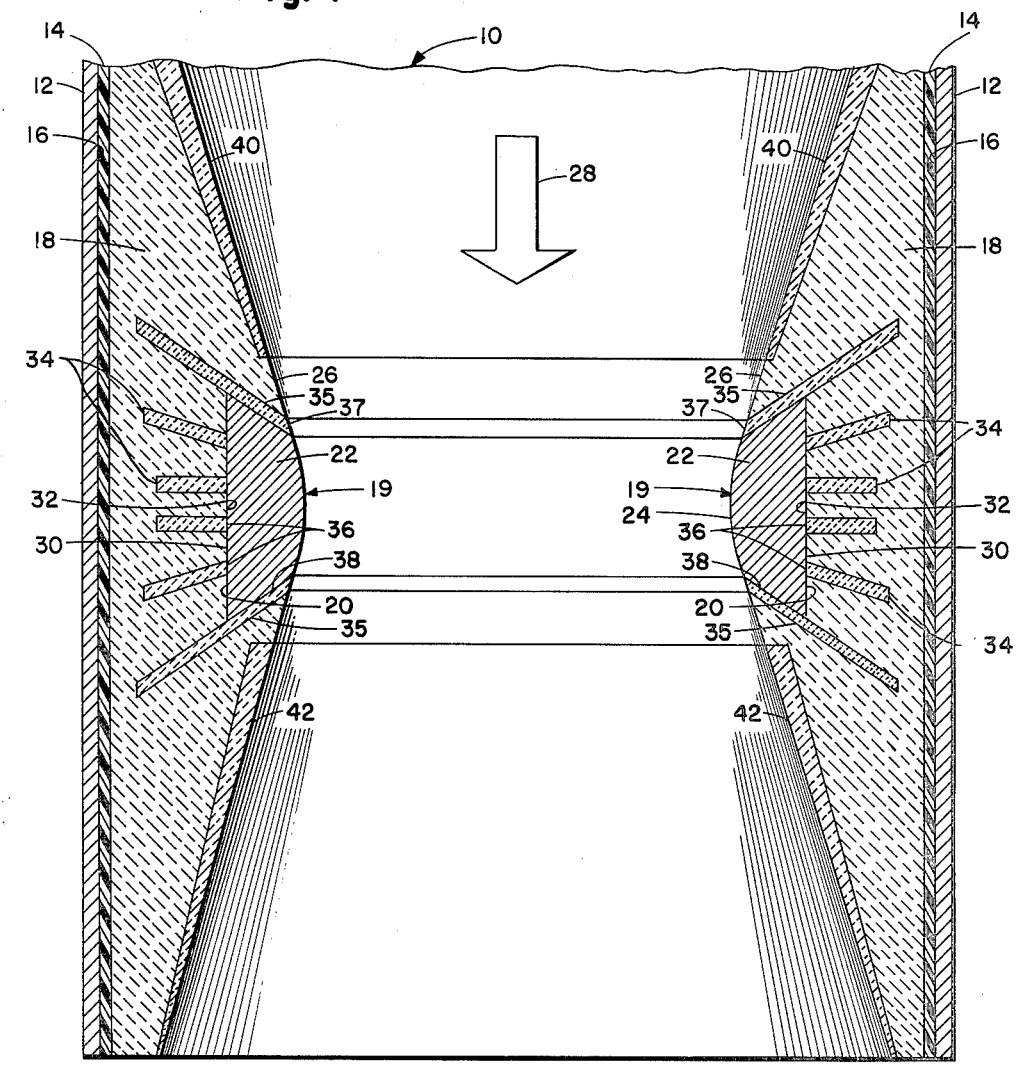
Figure 2:
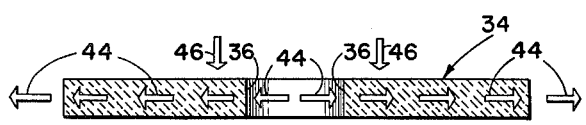

This and other objects of this invention will become more apparent when read in the light of the accompanying drawings wherein:

FGIURE 1 is a longitudinal cross-sectional view of a nozzle for a rocket motor constructed in accordance with the present invention; and FIGURE 2 is an enlarged cross-sectional view of a washer-shaped plate of pyrolytic graphite which is a component of the nozzle shown in FIGURE 1 and is used both as an insulator and as a heat conductor.

Referring now to FIGURE 1 of the drawing, a nozzle for a rocket motor, indicated generally by the reference numeral 10, comprises a tubular external structural housing 12 formed from steel or any common structural alloy. An insulator 14 formed from asbestos phenolic, refrasil phenolic, or any of the more common insulators, is secured to the inner surface 16 of the housing 12 by any suitable means. A tubular member 18 is shaped so its inner surface 26 is convergent-divergent to form a throat 19, and the tubular member 18 is secured to said housing 12 with said insulator 14 positioned therebetween. The tubular member 18 is formed from graphite of any density or other heat absorbing materials with a high melting point, such as boron carbide or beryllium oxide, to serve as a heat sink.

The throat 19 of heat sink 18 is provided with a recess 20 shaped to snugly receive a ring-like member or insert 22, as shown in FIGURE 1. Insert 22 is generally trapezoidal in cross-section. This insert is mounted in recess 20 with the small base 24 of the insert forming a continuation of the inner convergent-divergent surface 26 of the tubular heat sink 18. In this way, the small base 24 of the insert governs the geometry of the throat of the nozzle.

As shown in the drawing, the small base 24 of the insert is exposed to the hot gas stream flowing through the nozzle in the direction indicated by the arrow 28. Consequently, the insert 22 must be made of some erosion-resistant material such as tungsten or a tantalum-tungsten alloy. The large base 30 of insert 22 bears against the base 32 of recess 20. For reasons to become apparent below, the primary source of heat entering insert 22 is through the surface of small base 24. If the thermal conductivity of the insert 22 is greater than that of the heat sink 18, with the above arrangement, the trapezoidal geometry of the insert results in a lower temperature on the large base 30 and in the insert generally than would occur if the geometry of the insert were rectangular instead, producing thereby a decreasing temperature gradient.

A plurality of heat conductors 34, generally washer-like in shape, are embedded in heat sink 18 (see FIGURES 1 and 2). As best seen in FIGURE 1, the inner edges 36 of the washer-like heat conductors bear against the large base 30 of the insert 22. As a result, heat from insert 22 is rapidly conducted to heat sink 18 to subsequentially decrease the temperature of the insert and consequently decrease the erosion and distortion of the throat. Since, as explained above, the temperatures in the insert generally are lower with the trapezoidal rather than rectangular insert geometry, the number of heat conductors can be reduced. This may be an important factor if the cost or weight of these heat conductors is large. Heat transfer calculations show that temperature reductions of several hundred degrees F. in the insert at the throat are possible when these heat conductors are used. Consequently, rocket motors can use propellants with higher burning temperatures and more desirable properties from the point of view of thrust than was heretofore possible.

The sides 38 of the insert 22 are respectively covered with a washer-like plate 35 of an anisotropic material such as pyrolytic graphite. This anisotropic material is embedded in the heat sink 18 as shown in Figure 1, with an inner edge 37 exposed to the hot gas stream. The anistropic material is chosen so that the washer-like plate is a good heat conductor in directions parallel to the surfaces of the plate and is a good insulator in directions transverse to the surfaces of the plate. Consequently, the effect of the anisotropic plates covering the sides 38 of the insert and with inner edges exposed to the hot gas stream, is both to cool the temperature of the throat 19 adjacent the insert 22 while simultaneously preventing heat from the heat sink from flowing into the insert 22 through sides 38.

If the anisotropic plates 35 are formed from pyrolytic graphite, the crystals forming the pyroltic graphite plates are oriented, in a manner well known in the art, so they point away from the gas stream in the respective planes of the plates. This causes each of the washer-like plates to be a good conductor to heat passing through the plate in directions parallel to the surfaces of the plate and a good insulator to heat directed transversely to the surfaces of the plate. The insulating property of the anisotropic material comprising the plates 35 on the sides 38 of the insert 22 is useful because it prevents heat from entering the insert except through small base 24. This decreases the temperature of the insert and further reduces erosion.

If conditions adjacent the throat area are very severe, it may be necessary to cover portions of the convergent-divergent inner surface of the heat sink 18 with generally tubular flame barriers 40 ad 42. The flame barriers could be composed of thin sleeves of pyrolytic graphite with crystals oriented so they run in a direction parallel or nearly parallel to the gas stream to utilize the pyrolytic graphite as an insulator. Alternatively, an insulating material with a high melting point (above 5000° F.) which can withstand the initial thermal shock could be used. Under less severe conditions, the flame barriers 40 and 42 could be eliminated.

Although the heat sink 18 has been described as being formed from graphite, other materials which are good heat absorbers with a high melting point could be used, and if these materials have strong structural characteristics, it may be possible to eliminate the housing 12 and insulator 14 altogether. In the embodiment shown, all the washer-like heat conductors 34 and 35 are formed from pyrolytic graphite with their crystals or grains oriented in a direction away from the gas stream to provide good heat conductivity in directions parallel to the surfaces of the respective plates. The behavior of the pyrolytic graphite or other anisotropic material is illustrated in FIGURE 2 wherein arrows 44 representing heat flow show heat entering the washer-like anisotropic plate 34 through inner surface 36 and passing freely through the plate in directions parallel to the surfaces of the plate. In contrast, the arrow 46 representing the application of heat to the plate in a direction transverse to the surfaces of the plate shows that heat does not pass through the plate in that direction.

By constructing a nozzle for a rocket motor in accordance with the above-described teachings, the nozzle can be operated at a higher gas temperature with stable performance characteristics, so that the rocket motor can be propelled with more energetic fuels yielding a higher thrust.

It is to be understood that the form of the invention herewith shown and described is to be taken as a preferred example of the same, and that various changes in the shape, size, and arrangement of the parts may be resorted to without departing from the spirit of this invention or the scope of the claims.

I claim:
1. A nozzle for a rocket motor comprising a steel housing, an insulator secured to the inner surface of the housing, a convergent-divergent portion formed from graphite and comprising a heat sink secured to said housing with said insulator positioned therebetween, a tungsten insert trapezoidal in cross-section mounted in the throat of said convergent-divergent portion with the small base of said insert forming a continuation of the inner surface of the convergent-divergent portion and adapted to be exposed to the hot gas stream passing through the nozzle, the large base of said insert bearing against a surface of the heat sink so that a decreasing temperature gradient is formed in the insert extending from the small base to the large base whereby the temperature of the large base is lower than the temperature of the small base, a plurality of pyrolytic graphite plates embedded in the graphite heat sink, at least some of the plates being positioned so the inner edges thereof engage the large base of said insert, the crystals forming the pyrolytic graphite plates being oriented so that each of the plates is a good conductor of heat in directions parallel to the surfaces of the plate to effect a rapid transfer of heat from the large base of the insert to the heat sink and thereby reduce the temperature of the insert and decrease erosion, the sides of the insert being covered by respective washer-shaped plates of pyrolytic graphite with the inner edges thereof being exposed to the hot gas stream, the crystals in said latter plates of pyrolytic graphite being oriented so that each of said latter plates is a good heat conductor in directions parallel to the surfaces of the plate and a good insulator in directions transverse to the surfaces of the plate, said latter plates covering the sides of the insert acting both to cool the throat of the nozzle and to prevent heat from the heat sink from entering the insert through the sides thereof, whereby the nozzle can be operated at a higher gas temperature with a stable performance characteristic.

2. The nozzle described in claim 1 wherein the surface of the convergent-divergent portion adjacent the throat and on opposite sides thereof is covered by flame barriers, said flame barriers comprising thin tubular sleeves of pyrolytic graphite with crystals oriented to run in directions generally parallel to the hot gas stream passing through the nozzle whereby the pyrolytic graphite sleeves insulate the heat sink from the hot gases.

3. A high temperature gas nozzle of the class described comprising a convergent-divergent portion defining a throat, said convergent-divergent portion being formed from a heat absorbing material to serve as a heat sink, an insert formed from an erosion-resistant material with a high melting point, said insert being generally trapezoidal in cross-section and being mounted in said throat with the small base of the insert forming a continuous surface with the inner surface of said convergent-divergent portion so as to be exposed to the hot gas stream passing through the nozzle, the large base of said insert bearing against a surface of the heat sink so that the temperature of the large base will tend to be lower than the temperature of the small base, heat conductive means associated with the large base of said insert and said heat sink to effect a rapid transfer of heat to said heat sink, and insulating material positioned against the sides of said trapezoidal insert to prevent the flow of heat from heat sink to said insert through said sides, whereby the rapid conduction of heat from the insert to the heat sink reduces the temperature of the insert and thereby reduces erosion of the insert and distortion of the geometry of the throat so that the nozzle can be operated at a higher gas temperature with a stable performance characteristic.

4. A high temperature gas nozzle of the class described comprising a convergent-divergent portion defining a throat, said convergent-divergent portion being formed from a heat absorbing material to serve as a heat sink, an insert trapezoidal in cross-section mounted in said throat with the small base forming a continuous smooth surface with the inner surface of the convergent-divergent portion, said small base being adapted to be exposed to the hot gas stream passing through the nozzle, the large base of the insert contacting a surface of the heat sink so that the temperature of the large base will tend to be lower than the temperature of the small base, said insert being formed from an erosion-resistant material with a high melting point, at least one pyrolytic graphite plate being embedded in the heat sink with an edge in contact with a surface of said insert, the crystals of said pyrolytic graphite being oriented in directions parallel to the surfaces of the plate causing the plate to become a good heat conductor in directions parallel to the surfaces of the plate to effect a rapid conduction of heat from the insert to the heat sink and thereby reduce the temperature and erosion of the insert, the sides of the insert being respectively covered with an anisotropic plate embedded in the heat sink with one edge of the respective anisotropic plates being exposed to the hot gas stream, said anisotropic plates having good heat conducting characteristics in directions parallel to the surfaces of the plates and good heat insulating characteristics in directions perpendicular to the surfaces of the plates, whereby the anisotropic plates conduct heat away from the throat and prevent heat from the heat sink from entering the insert through the sides of the insert.

5. A high temperature gas nozzle of the class described comprising a convergent-divergent portion defining a throat, said convergent-divergent portion being formed from a heat absorbing material to serve as a heat sink, an insert trapezoidal in cross-section mounted in said throat with the small base forming a continuous smooth surface with the inner surface of the convergent-divergent portion, said small base being adapted to be exposed to the hot gas stream passing through the nozzle, the large base of the insert contacting a surface of the heat sink so that the temperature of the large base will tend to be lower than the temperature of the small base, said insert being formed from an erosion-resistant material with a high melting point, at least one pyrolytic graphite plate being embedded in the heat sink with an edge in contact with a surface of said insert, the crystals of said pyrolytic graphite plate being oriented in directions parallel to the surfaces of the plate causing the plate to become a good heat conductor in directions parallel to the surfaces of the plate to effect a rapid conduction of heat from the insert to the heat sink and thereby reduce the temperature and erosion of the insert, the sides of the trapezoidal insert being respectively covered with a pyrolytic graphite plate embedded in the heat sink, one edge of each of the latter pyrolytic graphite plates being exposed to the hot gas stream, the crystals forming the pyrolytic graphite material comprising the latter plates being oriented in directions parallel to the surfaces of the plates so that the plates are good heat conductors in these directions to effect a rapid transfer of heat from the surface of the throat to the heat sink and are good heat insulators in directions perpendicular to the surfaces of the plates whereby the plates prevent the flow of heat from the heat sink into the insert through the sides thereof.

References Cited by the Examiner

UNITED STATES PATENTS

| | | | |
|---|---|---|---|
| 2,574,190 | 11/1951 | New | 60—35.6 |
| 2,806,646 | 9/1957 | Rudman | 60—35.6 |
| 2,849,860 | 9/1958 | Lowe | 60—35.6 |
| 3,011,309 | 12/1961 | Carter | 60—35.6 |
| 3,069,847 | 12/1962 | Vest | 60—39.66 |
| 3,115,746 | 12/1963 | Hsia | 60—35.6 |

FOREIGN PATENTS 599,275    3/1948    Great Britain.

OTHER REFERENCES

Pyrographite Publication, Raytheon Company, received in Patent Office August 17, 1961, pp. 1–5.

MARK NEWMAN, *Primary Examiner.*

SAMUEL LEVINE, *Examiner.*